United States Patent
Yamamoto et al.

(10) Patent No.: US 10,553,906 B2
(45) Date of Patent: Feb. 4, 2020

(54) NONAQUEOUS ELECTROLYTE SECONDARY BATTERY POROUS LAYER

(71) Applicant: Sumitomo Chemical Company, Limited, Tokyo (JP)

(72) Inventors: Takuji Yamamoto, Niihama (JP); Kosuke Kurakane, Osaka (JP); Shizuka Iwata, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 16/168,891

(22) Filed: Oct. 24, 2018

(65) Prior Publication Data

US 2019/0123379 A1  Apr. 25, 2019

(30) Foreign Application Priority Data

Oct. 24, 2017  (JP) .................................. 2017-205593

(51) Int. Cl.
| | |
|---|---|
| *H01M 10/058* | (2010.01) |
| *H01M 4/62* | (2006.01) |
| *H01M 2/16* | (2006.01) |
| *H01M 10/0525* | (2010.01) |
| *H01M 10/052* | (2010.01) |

(52) U.S. Cl.
CPC ........... *H01M 10/058* (2013.01); *H01M 2/16* (2013.01); *H01M 2/1653* (2013.01); *H01M 2/1686* (2013.01); *H01M 4/624* (2013.01); *H01M 10/0525* (2013.01); *H01M 10/052* (2013.01)

(58) Field of Classification Search
None
See application file for complete search history.

(56) References Cited

U.S. PATENT DOCUMENTS

| | | | | |
|---|---|---|---|---|
| 2013/0323569 A1* | 12/2013 | Yeou | ..................... | H01M 2/145 |
| | | | | 429/144 |
| 2015/0056490 A1 | 2/2015 | Shimizu et al. | | |
| 2017/0040584 A1* | 2/2017 | Kurakane | ........... | H01M 2/1653 |

FOREIGN PATENT DOCUMENTS

| | | | | | |
|---|---|---|---|---|---|
| JP | 2012049018 A | * | 3/2012 | .............. | H01M 2/16 |
| JP | 2012252969 A | * | 12/2012 | .............. | H01M 2/16 |
| JP | 2013251259 A | | 12/2013 | | |
| JP | 2015185482 A | * | 10/2015 | .............. | H01M 2/16 |
| KR | 20150034825 A | * | 4/2015 | ............ | H01M 2/145 |
| KR | 20160121535 A | * | 10/2016 | ......... | H01M 2/1653 |
| KR | 20170056452 A | * | 5/2017 | ............ | H01M 2/162 |
| WO | 2012043812 A1 | | 4/2012 | | |
| WO | 2013154090 A1 | | 10/2013 | | |
| WO | 2015029835 A1 | | 3/2015 | | |

OTHER PUBLICATIONS

CSP search report at KIPO, dated Apr. 16, 2019, pp. 1-2.*
First office action at KIPO, dated Apr. 18, 2019, p. 1.*
Emulsifiers for Emulsion Polymerization, Sanyo Chemical News, Early Summer 2010, No. 460, URL, https://www.sanyo-chemical.co.jp/pr/pdf/pk85.pdf.
Office Action dated Apr. 2, 2019 in JP Application No. 2018200121.
Office Action dated Sep. 3, 2019 in KR Application No. 1020180127131.

* cited by examiner

*Primary Examiner* — Daniel S Gatewood
(74) *Attorney, Agent, or Firm* — Panitch Schwarze Belisario & Nadel LLP

(57) ABSTRACT

The present invention provides a nonaqueous electrolyte secondary battery including a porous layer which includes an organic filler in which Na element, Al element, and/or K element are contained, a total amount of the Na element, the Al element, and the K element contained falling within a certain range. The nonaqueous electrolyte secondary battery porous layer allows the nonaqueous electrolyte secondary battery to have an excellent battery capacity recovery rate after storage at a constant-voltage charge at a high temperature.

9 Claims, No Drawings

NONAQUEOUS ELECTROLYTE SECONDARY BATTERY POROUS LAYER

This Nonprovisional application claims priority under 35 U.S.C. § 119 on Patent Application No. 2017-205593 filed in Japan on Oct. 24, 2017, the entire contents of which are hereby incorporated by reference.

TECHNICAL FIELD

The present invention relates to a porous layer for a nonaqueous electrolyte secondary battery (hereinafter referred to as "nonaqueous electrolyte secondary battery porous layer").

BACKGROUND ART

Nonaqueous electrolyte secondary batteries, particularly lithium ion secondary batteries, have a high energy density and are therefore in wide use as batteries for personal computers, mobile phones, portable information terminals, and the like. Such nonaqueous electrolyte secondary batteries have recently been developed as on-vehicle batteries.

As a member of such a nonaqueous electrolyte secondary battery, a separator having excellent heat resistance has been developed.

As a nonaqueous electrolyte secondary battery porous layer included in a separator for a nonaqueous electrolyte secondary battery (hereinafter referred to as "nonaqueous electrolyte secondary battery separator") which nonaqueous electrolyte secondary battery separator has excellent heat resistance, a porous layer including an organic filler has been developed. For example, Patent Literature 1 discloses a lithium secondary battery separator including a porous base material and a coating layer which is located on at least one surface of the porous base material and which contains organic particles and a binder polymer, the binder polymer being contained in an amount of 50% by weight to 99% by weight relative to a total weight of the coating layer.

CITATION LIST

Patent Literature

[Patent Literature 1]
Japanese Patent Application Publication, Tokukai, No. 2013-251259 (Publication Date: Dec. 12, 2013)

SUMMARY OF INVENTION

Technical Problem

However, a nonaqueous electrolyte secondary battery including a porous layer containing a conventional organic filler still has room for improvement in terms of a battery capacity recovery rate after storage at a constant-voltage charge at a high temperature.

Solution to Problem

The present invention encompasses any of aspects described in the following [1] through [5].
[1] A nonaqueous electrolyte secondary battery porous layer including: an organic filler, the organic filler containing at least one metallic element selected from the group consisting of Na element, Al element, and K element so that a total amount of the Na element, the Al element, and the K element contained in the organic filler satisfies the following formula:

$$10 \text{ (mg/kg)} \leq \text{the total amount of the Na element, the Al element, and the K element} \leq 2000 \text{ (mg/kg)}.$$

[2] The nonaqueous electrolyte secondary battery porous layer described in [1], further including: a binder resin.
[3] The nonaqueous electrolyte secondary battery porous layer described in [2], in which the binder resin is at least one resin selected from the group consisting of a polyolefin, a (meth)acrylate-based resin, a fluorine-containing resin, a polyamide-based resin, a polyester-based resin, and a water-soluble polymer.
[4] The nonaqueous electrolyte secondary battery porous layer described in [3], in which the polyamide-based resin is an aramid resin.
[5] A nonaqueous electrolyte secondary battery laminated separator including: a polyolefin porous film; and a nonaqueous electrolyte secondary battery porous layer described in any one of [1] through [4], the nonaqueous electrolyte secondary battery porous layer being disposed on at least one surface of the polyolefin porous film.
[6] A nonaqueous electrolyte secondary battery member including: a positive electrode; a nonaqueous electrolyte secondary battery porous layer described in any one of [1] through [4] or a nonaqueous electrolyte secondary battery laminated separator described in [5]; and a negative electrode, the positive electrode, the nonaqueous electrolyte secondary battery porous layer or the nonaqueous electrolyte secondary battery laminated separator, and the negative electrode being arranged in this order.
[7] A nonaqueous electrolyte secondary battery including: a nonaqueous electrolyte secondary battery porous layer described in any one of [1] through [4] or a nonaqueous electrolyte secondary battery laminated separator described in [5].

Advantageous Effects of Invention

A nonaqueous electrolyte secondary battery porous layer in accordance with an embodiment of the present invention advantageously allows a nonaqueous electrolyte secondary battery, which includes the nonaqueous electrolyte secondary battery porous layer, to have an improved battery capacity recovery rate after storage at a constant-voltage charge at a high temperature.

DESCRIPTION OF EMBODIMENTS

The following description will discuss an embodiment of the present invention. The present invention is, however, not limited to such an embodiment. Further, the present invention is not limited to the description of the arrangements below, but may be altered in various ways by a skilled person within the scope of the claims. Any embodiment based on a proper combination of technical means disclosed in different embodiments is also encompassed in the technical scope of the present invention. Any numerical range expressed as "A to B" herein means "not less than A and not more than B" unless otherwise stated.

[Embodiment 1: Nonaqueous Electrolyte Secondary Battery Porous Layer]

A nonaqueous electrolyte secondary battery porous layer in accordance with an embodiment of the present invention (hereinafter also simply referred to as "porous layer") includes an organic filler. The organic filler contains at least one metallic element selected from the group consisting of Na element, Al element, and K element so that a total amount of the Na element, the Al element, and the K element contained in the organic filler satisfies the following formula:

10 (mg/kg)≤the total amount of the Na element, the Al element, and the K element≤2000 (mg/kg).

<Nonaqueous Electrolyte Secondary Battery Porous Layer>

The porous layer in accordance with an embodiment of the present invention can be, as a member included in a nonaqueous electrolyte secondary battery, provided between (i) a nonaqueous electrolyte secondary battery separator including a polyolefin porous film and (ii) at least one of a positive electrode plate and a negative electrode plate. In a case where the porous layer in accordance with an embodiment of the present invention is disposed on at least one surface of a polyolefin porous film, the porous layer can serve as a member of a laminated separator for a nonaqueous electrolyte secondary battery (hereinafter referred to as "nonaqueous electrolyte secondary battery laminated separator") in accordance with Embodiment 2 of the present invention. Alternatively, the porous layer in accordance with an embodiment of the present invention can be disposed on an active material layer of at least one of the positive electrode plate and the negative electrode plate. Alternatively, the porous layer in accordance with an embodiment of the present invention can be provided between the nonaqueous electrolyte secondary battery separator and at least one of the positive electrode plate and the negative electrode plate so as to be in contact with the nonaqueous electrolyte secondary battery separator and/or with the at least one of the positive electrode plate and the negative electrode plate. Alternatively, the porous layer in accordance with an embodiment of the present invention alone can serve as a nonaqueous electrolyte secondary battery separator in a case where, for example, the porous layer is provided on an electrode.

The porous layer in accordance with an embodiment of the present invention has a structure in which many pores, connected to one another, are provided, so that the porous layer is a layer through which a gas or a liquid can pass from one surface to the other. Further, in a case where the porous layer in accordance with an embodiment of the present invention is used as a member included in a nonaqueous electrolyte secondary battery laminated separator, the porous layer can be a layer which, serving as an outermost layer of the nonaqueous electrolyte secondary battery laminated separator, comes into contact with an electrode.

<Organic Filler>

A metal foreign object in a nonaqueous electrolyte secondary battery porous layer inhibits movement of electrically conducive ions. Therefore, conventionally, it was considered not preferable that metallic elements be contained in a nonaqueous electrolyte secondary battery porous layer.

However, it was found that a porous layer, which contains an organic filler containing a specific amount of specific metal, allows a nonaqueous electrolyte secondary battery, which includes the porous layer, to have an improved battery capacity recovery rate after storage at a constant-voltage charge at a high temperature.

Specifically, in a case where the organic filler contains at least one metallic element selected from the group consisting of Na element, Al element, and K element so that a total amount of the Na element, the Al element, and the K element contained in the organic filler satisfies the following formula, a nonaqueous electrolyte secondary battery including the porous layer has an improved battery capacity recovery rate after storage at a constant-voltage charge at a high temperature:

10 (mg/kg)≤the total amount of the Na element, the Al element, and the K element≤2000 (mg/kg).

The total amount of the Na element, Al element, and K element contained in the organic filler can be 10 (mg/kg) to 2000 (mg/kg), preferably 10 (mg/kg) to 1800 (mg/kg), more preferably 10 (mg/kg) to 1500 (mg/kg), still more preferably (mg/kg) to 1400 (mg/kg), particularly preferably 15 (mg/kg) to 1000 (mg/kg), and most preferably 15 (mg/kg) to 300 (mg/kg).

Note that "total amount of Na element, Al element, and K element contained in an organic filler" means a total amount of the Na element, the Al element, and the K element in terms of metallic element relative to a total weight of the organic filler containing (i) at least one metallic element selected from the group consisting of the Na element, the Al element, and the K element, (ii) other additive, and (iii) other impurities. The total amount of the Na element, the Al element, and the K element contained can be determined by, for example, (i) separating the organic filler from a nonaqueous electrolyte secondary battery porous layer, (ii) obtaining a total weight of the Na element, the Al element, and the K element in the organic filler by subjecting the Na element, the Al element, and the K element each to quantitative analysis, and (iii) dividing the total weight by a weight of the organic filler. A method of subjecting the Na element, the Al element, and the K element in the organic filler to quantitative analysis can be any method, and is not limited to any particular one. Examples of the method of the quantitative analysis encompass IPC emission spectrometry, fluorescent X-ray analysis (EDX), atomic absorption analysis (AA), ion chromatograph (IC), and wavelength dispersive X-ray fluorescence analysis (WDX).

A method of separating the organic filler from the nonaqueous electrolyte secondary battery porous layer is also not limited. For example, in a case where the nonaqueous electrolyte secondary battery porous layer includes the organic filler and a binder resin, it is possible to carry out a method in which only the organic filler is separated by dissolving the binder resin in a solvent in which (i) only the binder resin is soluble and (ii) the organic filler is insoluble.

In the organic filler, Na element, Al element, and K element can each be present in any form. For example, any of the Na element, the Al element, and the K element can be present as a compound or as an ion.

The organic filler needs to contain at least one metallic element selected from the group consisting of Na element, Al element, and K element. Therefore, the organic filler can contain all of Na element, Al element, and K element. Alternatively, the organic filler can contain only Na element and Al element. Alternatively, the organic filler can contain only Na element and K element. Alternatively, the organic filler can contain only Al element and K element. Alternatively, the organic filler can contain only one of Na element, Al element, and K element.

In a case where the total amount of Na element, Al element, and K element contained in the organic filler falls within any of the above ranges, there is an improvement in a battery capacity recovery rate after storage at a constant-voltage charge at a high temperature. This is possibly because of the following reasons. A nonaqueous electrolyte secondary battery is charged and discharged by movement of electrically conducive ions such as lithium ions. In a case where the electrically conductive ions are adsorbed to a nonaqueous electrolyte secondary battery separator, a concentration of the electrically conductive ions in the nonaqueous electrolyte secondary battery may decrease. Meanwhile, in a case where the total amount of the Na element, the Al element, and the K element contained in the organic filler falls within any of the above ranges, these elements are already present on the nonaqueous electrolyte secondary battery separator. This restricts adsorption of the electrically conductive ions to the nonaqueous electrolyte secondary battery separator. Hence, it is considered that a decrease in the concentration of the electrically conducive ions in the nonaqueous electrolyte secondary battery can be restricted, and therefore a battery capacity recovery rate after storage at a constant-voltage charge at a high temperature can be improved. It is also considered that Na element, Al element, and K element each have an effect of restricting generation of hydrofluoric acid which is generated by a reaction between an electrolyte and water. It is commonly known that hydrofluoric acid generated in a battery causes a deterioration of the battery.

In a case where the nonaqueous electrolyte secondary battery is, for example, a lithium ion secondary battery, a metallic element(s) contained in the organic filler is preferably an element(s) having an ionization tendency similar to that of lithium. Therefore, the organic filler preferably contains at least one of Na element and K element.

According to the nonaqueous electrolyte secondary battery including the porous layer, the battery capacity recovery rate after storage at a constant-voltage charge at a high temperature, as determined by a method in Examples described later, is preferably not less than 75%, more preferably not less than 78%, and still more preferably not less than 80%.

Specific examples of an organic matter constituting the organic filler encompass: resorcin-formalin resins (RF resin); (i) a homopolymer of a monomer such as styrene, vinyl ketone, acrylonitrile, methyl methacrylate, ethyl methacrylate, glycidyl methacrylate, glycidyl acrylate, or methyl acrylate or (ii) a copolymer of two or more of such monomers; fluorine-containing resins such as polytetrafluoroethylene, an ethylene tetrafluoride-propylene hexafluoride copolymer, an ethylene tetrafluoride-ethylene copolymer, and polyvinylidene fluoride; urea resin; polyethylene; polypropylene; and polyacrylic acid and polymethacrylic acid.

The organic filler can be made of one kind of the organic matters described above or can be made of a mixture of two or more kinds of the organic matters described above.

The organic filler is contained in the porous layer in accordance with an embodiment of the present invention in an amount of preferably not less than 50% by weight, more preferably not less than 70% by weight, and still more preferably not less than 90% by weight, relative to a total weight of the entire porous layer. The amount of the organic filler contained is preferably not more than 99.5% by weight, and more preferably not more than 98% by weight. In view of heat resistance, the amount of the organic filler contained is preferably not less than 50% by weight. Meanwhile, in view of adhesion between particles of the filler, the amount of the organic filler contained is preferably not more than 99.5% by weight. A porous layer including such an organic filler can have improved slidability and heat resistance.

According to the porous layer in accordance with an embodiment of the present invention, a value of D50 in a volume-based particle size distribution of the organic filler (hereinafter also simply referred to "D50") is preferably not more than 3 µm, and more preferably not more than 1 µm.

D50 of the organic filler is preferably not less than 0.01 µm, more preferably not less than 0.05 µm, and still more preferably not less than 0.1 µm.

In a case where D50 of the organic filler included in the porous layer in accordance with an embodiment of the present invention falls within the above preferable ranges, it is possible to (i) secure good air permeability, good adhesiveness, and good slidability of the porous layer and (ii) impart excellent formability to the porous layer.

The organic filler can have any shape and is not limited to any particular shape. The organic filler can be, for example, a particulate filler. Example of the shape of particles of the organic filler encompass: a spherical shape; an elliptical shape; a plate-like shape; a bar shape; an irregular shape; a fibrous shape; and shapes, such as a peanut-like shape and a tetrapod-like shape, which are formed by bonding of particles having spherical shapes or pillar shapes.

There is no particular limitation on a method of producing the organic filler containing Na element, Al element, and K element at a total amount falling within the above ranges. For example, any of the following methods (1) through (4) can be used.

(1) In a case where an organic filler is synthesized in a solution, concentrations of Na element, Al element, and K element in a solvent are adjusted. This causes a total amount of the Na element, the Al element, and the K element, which are contained in the organic filler to be obtained, to fall within the above ranges. The solvent can be water, an organic solvent, or a mixture of water and an organic solvent. Examples of the water encompass, but are not particularly limited to, ion electrolyzed water, ion exchange water, distilled water, tap water, spring water, well water, ground water, mineral water, and industrial water. Examples of the method of adjusting the concentrations of the Na element, the Al element, and the K element in the solvent encompass (i) a method in which a compound containing Na element, Al element, and K element is added to water, an organic solvent, or a mixture of water and an organic solvent and (ii) a method in which any one/ones of the waters listed above is/are mixed as appropriate so as to adjust concentrations of Na element, Al element, and K element in a solvent.

(2) A catalyst containing at least one metallic element selected from the group consisting of Na element, Al element, and K element is used as a catalyst for use in synthesis of an organic filler. This causes a total amount of the Na element, the Al element, and the K element, which are contained in the organic filler to be obtained, to fall within the above ranges.

(3) At least one metallic element selected from the group consisting of Na element, Al element, and K element is added during a reaction to synthesize an organic filler. This causes a total amount of the Na element, the Al element, and the K element, which are contained in the organic filler to be obtained, to fall within the above ranges. Note that the at least one metallic element selected from the group consisting of Na element, Al element, and K element can be added as a compound or as an ion.

(4) An organic filler obtained by synthesis is cleaned with use of a cleaning liquid containing at least one metallic element selected from the group consisting of Na element, Al element, and K element. This causes a total amount of the Na element, the Al element, and the K element, which are contained in the organic filler to be obtained, to fall within the above ranges.

<Binder Resin>

The porous layer in accordance with an embodiment of the present invention can contain not only an organic filler but also a binder resin. A function of the binder resin is, for example, to (i) bind particles of the organic filler to each other, (ii) bind the organic filler to an electrode, and (iii) bind the organic filler to the polyolefin porous film.

The binder resin is preferably (i) insoluble in an electrolyte of a nonaqueous electrolyte secondary battery and (ii) electrochemically stable when the nonaqueous electrolyte secondary battery is in normal use. Specific examples of the binder resin encompass: polyolefins such as polyethylene, polypropylene, polybutene, and an ethylene-propylene copolymer; a (meth)acrylate-based resin; fluorine-containing resins such as polyvinylidene fluoride (PVDF), polytetrafluoroethylene, a vinylidene fluoride-hexafluoropropylene copolymer, a tetrafluoroethylene-hexafluoropropylene copolymer, a tetrafluoroethylene-perfluoroalkyl vinyl ether copolymer, a vinylidene fluoride-tetrafluoroethylene copolymer, a vinylidene fluoride-trifluoroethylene copolymer, a vinylidene fluoride-trichloroethylene copolymer, a vinylidene fluoride-vinyl fluoride copolymer, a vinylidene fluoride-hexafluoropropylene-tetrafluoroethylene copolymer, and an ethylene-tetrafluoroethylene copolymer; a fluorine-containing rubber having a glass transition temperature of equal to or less than 23° C., among the fluorine-containing resins; polyamide-based resins such as aramid resins such as aromatic polyamide and wholly aromatic polyamide; polyester-based resins such as (i) aromatic polyester such as polyarylate and (ii) liquid crystal polyester; rubbers such as a styrene-butadiene copolymer and a hydride thereof, a methacrylic acid ester copolymer, an acrylonitrile-acrylic acid ester copolymer, a styrene-acrylic acid ester copolymer, ethylene propylene rubber, and polyvinyl acetate; resins with a melting point or glass transition temperature of not lower than 180° C. such as polyphenylene ether, polysulfone, polyether sulfone, polyphenylene sulfide, polyetherimide, polyamide imide, and polyether amide; water-soluble polymers such as polyvinyl alcohol, polyethylene glycol, cellulose ether, sodium alginate, polyacrylic acid, polyacrylamide, and polymethacrylic acid; and polycarbonate, polyacetal, and polyether ether ketone.

Alternatively, a water-insoluble polymer can be suitably used as the binder resin contained in the porous layer in accordance with an embodiment of the present invention. In other words, the porous layer in accordance with an embodiment of the present invention containing the water-insoluble polymer (e.g., acrylate resin) as the binder resin is produced preferably with the use of an emulsion obtained by dispersing the water-insoluble polymer in an aqueous solvent.

Note that "water-insoluble polymer" means a polymer which does not dissolve in an aqueous solvent but can become particles so as to be dispersed in an aqueous solvent. In particular, "water-insoluble polymer" herein refers to a polymer which has an insoluble content of not less than 90% by weight in a case where 0.5 g of the polymer is mixed with 100 g of water at 25° C. Meanwhile, the "water-soluble polymer" refers to a polymer which has an insoluble content of less than 0.5% by weight in a case where 0.5 g of the polymer is mixed with 100 g of water at 25° C. The shape of the particles of the water-insoluble polymer is not limited to any particular one, but is preferably a spherical shape.

The water-insoluble polymer is produced as polymer particles by, for example, polymerizing, in an aqueous solvent, a monomer composition containing a monomer (described later).

Examples of the monomer constituting the water-insoluble polymer encompass styrene, vinyl ketone, acrylonitrile, methyl methacrylate, ethyl methacrylate, glycidyl methacrylate, glycidyl acrylate, methyl acrylate, ethyl acrylate, and butyl acrylate.

The aqueous solvent contains water, and is not limited to any particular one, provided that the water-insoluble polymer particles can be dispersed in the aqueous solvent.

The aqueous solvent can contain an organic solvent which can be dissolved in water at any ratio to the water. Examples of such an organic solvent encompass methanol, ethanol, isopropyl alcohol, acetone, tetrahydrofuran, acetonitrile, and N-methylpyrrolidone. The aqueous solvent can also contain (i) a surfactant such as sodium dodecylbenzene sulfonate, (ii) a dispersing agent such as a polyacrylic acid or a sodium salt of carboxymethyl cellulose, and/or (iii) the like.

Note that the porous layer in accordance with an embodiment of the present invention can contain a single kind of binder resin or can contain a mixture of two or more kinds of binder resins.

Specific examples of the aramid resin encompass poly (paraphenylene terephthalamide), poly(methaphenylene isophthalamide), poly(parabenzamide), poly(metabenzamide), poly(4,4'-benzanilide terephthalamide), poly(paraphenylene-4,4'-biphenylene dicarboxylic acid amide), poly (methaphenylene-4,4'-biphenylene dicarboxylic acid amide), poly(paraphenylene-2,6-naphthalene dicarboxylic acid amide), poly(methaphenylene-2,6-naphthalene dicarboxylic acid amide), poly(2-chloroparaphenylene terephthalamide), a paraphenylene terephthalamide/2,6-dichloroparaphenylene terephthalamide copolymer, and a methaphenylene terephthalamide/2,6-dichloroparaphenylene terephthalamide copolymer. Among these aromatic polyamides, poly(paraphenylene terephthalamide) is more preferable.

Among the above binder resins, a polyolefin, a (meth) acrylate-based resin, a fluorine-containing resin, a polyamide-based resin, a polyester-based resin, a water-soluble polymer, or the water-insoluble polymer in the form of particles dispersed in the aqueous solvent is more preferable. Among these resins, in a case where the porous layer is arranged so as to face a positive electrode, a fluorine-containing resin is still more preferable, and a polyvinylidene fluoride-based resin is particularly preferable. This is because such a resin makes it easy to maintain various properties, such as a rate characteristic and a resistance characteristic (solution resistance), of a nonaqueous electrolyte secondary battery even in a case where the nonaqueous electrolyte secondary battery suffers acidic deterioration during operation of the nonaqueous electrolyte secondary battery. Examples of the polyvinylidene fluoride-based resin encompass: a homopolymer of vinylidene fluoride (that is, polyvinylidene fluoride); and a copolymer of vinylidene fluoride and at least one monomer selected from the group consisting of hexafluoropropylene, tetrafluoroethylene, trifluoroethylene, trichloroethylene, and vinyl fluoride is particularly preferable.

Further, the water-soluble polymer or the water-insoluble polymer which is in the form of particles dispersed in the aqueous solvent is more preferable in view of a process and an environmental impact, because water can be used as a solvent to form the porous layer. The water-soluble polymer is still more preferably cellulose ether or sodium alginate, and particularly preferably cellulose ether.

Specific examples of the cellulose ether encompass carboxymethyl cellulose (CMC), hydroxyethyl cellulose (HEC), carboxyethyl cellulose, methyl cellulose, ethyl cellulose, cyanoethyl cellulose, and oxyethyl cellulose. The cellulose ether is more preferably CMC or HEC, and particularly preferably CMC, because CMC and HEC degrade less over an extended period of time of use and are excellent in chemical stability.

In view of adhesiveness between particles of an organic filler, the water-insoluble polymer in the form of particles dispersed in the aqueous solvent is preferably a homopolymer of an acrylate monomer, such as methyl methacrylate, ethyl methacrylate, glycidyl methacrylate, glycidyl acrylate, methyl acrylate, ethyl acrylate, or butyl acrylate. Alternatively, the water-insoluble polymer is preferably a copolymer of two or more kinds of the monomers.

The binder resin is contained in the porous layer in accordance with an embodiment of the present invention in an amount of preferably not less than 1% by weight and more preferably not less than 2% by weight, relative to a total weight of the entire porous layer. In addition, the binder resin is contained in the porous layer in an amount of preferably not more than 50% by weight and more preferably not more than 30% by weight, relative to a total weight of the entire porous layer. The amount of the binder resin contained is preferably not less than 1% by weight, in view of the fact that such a content improves adhesion between particles of an organic filler, that is, in view of prevention of the organic filler from falling off from the porous layer. The amount of the binder resin contained is preferably not more than 50% by weight, in view of a battery characteristic (particularly resistance to ion permeation) and heat resistance of a nonaqueous electrolyte secondary battery.

<Other Components>

The porous layer in accordance with an embodiment of the present invention can include a component other than the organic filler and the binder resin. Examples of such a component encompass a surfactant and wax. Such a component is contained in an amount of preferably 0% by weight to 50% by weight, relative to a total weight of the entire porous layer.

<Method of Producing Nonaqueous Electrolyte Secondary Battery Porous Layer>

The porous layer in accordance with an embodiment of the present invention can be produced by a method, examples of which encompass, but are not particularly limited to, a method in which (i) a base material is coated with a coating solution containing the organic filler and the resin and then (ii) a solvent (dispersion medium) in the coating solution is removed by drying. In a coating solution, the organic filler can be dispersed, and the resin can be dissolved. Examples of the base material encompass, but are not particularly limited to, (i) a polyolefin porous film which serves as a base material of a nonaqueous electrolyte secondary battery separator (described later) in accordance with an embodiment of the present invention or (ii) an electrode sheet.

The solvent (dispersion medium) in the coating solution is not limited to any particular one, provided that (i) the solvent does not adversely affect the base material, (ii) the solvent allows the resin to be dissolved or dispersed in the solvent uniformly and stably, and (iii) the solvent allows the organic filler to be dispersed in the solvent stably. Examples of the solvent (dispersion medium) encompass N-methylpyrrolidone, N, N-dimethylacetamide, N,N-dimethylformamide, acetone, and water.

In view of adhesiveness of the porous layer to an electrode (electrode sheet) and ion permeability of the porous layer, a coating amount (weight per unit area) of the porous layer per layer of the porous layer is, typically, preferably 0.5 g/m² to 20 g/m², more preferably 0.5 g/m² to 10 g/m², and still more preferably 0.5 g/m² to 7 g/m², in terms of solid content. That is, an amount of the coating solution to be applied to the base material is preferably adjusted so that the porous layer to be obtained will have a coating amount (weight per unit area) within the above ranges.

A suitable solid content concentration of the coating solution may vary depending on, for example, the kind of the organic filler. In general, the solid content concentration is preferably more than 20% by weight and not more than 40% by weight.

When the base material is coated with the coating solution, a coating shear rate may vary depending on, for example, the kind of the organic filler. In general, the coating shear rate is preferably not less than 2 (1/s) and more preferably 4 (1/s) to 50 (1/s).

In order to secure (i) adhesiveness of the porous layer to an electrode and (ii) a high energy density, an average thickness of the porous layer in accordance with an embodiment of the present invention is preferably 0.5 µm to 25 µm (per layer), more preferably 0.5 µm to 10 µm (per layer), and still more preferably 1 µm to 5 µm (per layer).

In view of ion permeability, the porous layer in accordance with an embodiment of the present invention preferably has a sufficiently porous structure. Specifically, the porous layer preferably has a porosity of 30% to 60%. Furthermore, the porous layer in accordance with an embodiment of the present invention has an average pore diameter of preferably 20 nm to 100 nm.

[Embodiment 2: Nonaqueous Electrolyte Secondary Battery Laminated Separator]

The nonaqueous electrolyte secondary battery laminated separator in accordance with Embodiment 2 of the present invention includes (i) a polyolefin porous film and (ii) the porous layer which is disposed on at least one surface of the polyolefin porous film.

<Polyolefin Porous Film>

The polyolefin porous film can be a base material for a nonaqueous electrolyte secondary battery laminated separator in accordance with an embodiment of the present invention. The polyolefin porous film contains a polyolefin-based resin as a main component. The polyolefin porous film has therein many pores which are connected to one another, so that a gas, a liquid, or the like can pass through the polyolefin porous film from one surface to the other. The polyolefin porous film can include a single layer or a plurality of layers which are disposed on top of each other.

The expression that a "polyolefin porous film contains a polyolefin-based resin as a main component" means that the polyolefin-based resin accounts for not less than 50% by volume, preferably not less than 90% by volume, and more preferably not less than 95% by volume, of the entire polyolefin porous film. The polyolefin-based resin more preferably contains a high molecular weight component having a weight-average molecular weight of $3 \times 10^5$ to $15 \times 10^6$. In particular, the polyolefin more preferably contains a high molecular weight component having a weight-average molecular weight of not less than 1,000,000. This is because, in such a case, there is an increase in strength of a nonaqueous electrolyte secondary battery laminated separator in accordance with an embodiment of the present invention, which is a laminated body in which a nonaqueous electrolyte secondary battery porous layer in accordance with an embodiment of the present invention is disposed on one surface or both surfaces of the polyolefin porous film.

Examples of the polyolefin-based resin which is a main component of the polyolefin porous film encompass, but are not particularly limited to, homopolymers (such as polyethylene, polypropylene, and polybutene) and copolymers (such as an ethylene-propylene copolymer), any of which is obtained through (co)polymerization of a monomer such as ethylene, propylene, 1-butene, 4-methyl-1-pentene, and 1-hexene (which are thermoplastic resins). Among these, polyethylene is preferable because it is capable of preventing (shutting down) a flow of an excessively large electric current at a lower temperature. Examples of the polyethylene encompass low-density polyethylene, high-density polyethylene, linear polyethylene (an ethylene-α-olefin copolymer), and ultra-high molecular weight polyethylene having a weight-average molecular weight of not less than 1,000,000. Among these, the polyethylene is more preferably (i) high molecular weight polyethylene having a weight-average molecular weight of 300,000 to 1,000,000 or (ii) ultra-high molecular weight polyethylene having a weight-average molecular weight of not less than 1,000,000. Specific examples of the polyolefin-based resin encompass a polyolefin-based resin made of a mixture of (i) a polyolefin having a weight-average molecular weight of not less than 1,000,000 and (ii) a low molecular weight polyolefin having a weight-average molecular weight of not more than 10,000.

A thickness of the polyolefin porous film can be set as appropriate in view of a thickness of a laminated body which is the nonaqueous electrolyte secondary battery laminated separator in accordance with an embodiment of the present invention. The thickness of the polyolefin porous film is preferably 4 μm to 40 μm (per layer) and more preferably 5 μm to 20 μm (per layer).

The polyolefin porous film preferably has a thickness of not less than 4 μm (per layer). This is because, in a nonaqueous electrolyte secondary battery including a nonaqueous electrolyte secondary battery laminated separator using the polyolefin porous film having such a thickness, it is possible to sufficiently prevent an internal short circuit that might occur due to, for example, breakage of the nonaqueous electrolyte secondary battery. Meanwhile, the polyolefin porous film preferably has a thickness of not more than 40 μm (per layer). This is because, with such a thickness, (i) it is possible to restrict an increase in resistance to lithium ion permeation all over the nonaqueous electrolyte secondary battery laminated separator which includes the polyolefin porous film, (ii) it is possible to prevent a positive electrode from deteriorating and also to prevent a rate characteristic and a cycle characteristic from decreasing in a case where a charge-discharge cycle is repeated, in a nonaqueous electrolyte secondary battery including the nonaqueous electrolyte secondary battery laminated separator, and (iii) it is possible to prevent an increase in size of the nonaqueous electrolyte secondary battery itself in a case where a distance between the positive electrode and a negative electrode increases.

The polyolefin porous film has a weight per unit area which can be set as appropriate, in view of strength, a thickness, a weight, and handleability of the nonaqueous electrolyte secondary battery laminated separator including the polyolefin porous film. Specifically, the weight per unit area of the porous film is, typically, preferably 4 $g/m^2$ to 20 $g/m^2$ (per layer) and more preferably 5 $g/m^2$ to 12 $g/m^2$ (per layer), so as to allow the nonaqueous electrolyte secondary battery including the nonaqueous electrolyte secondary battery laminated separator to have a higher weight energy density and a higher volume energy density.

The polyolefin porous film has an air permeability of preferably 30 sec/100 mL to 500 sec/100 mL and more preferably 50 sec/100 mL to 300 sec/100 mL, in terms of Gurley values. A polyolefin porous film having such an air permeability allows a nonaqueous electrolyte secondary battery laminated separator including the polyolefin porous film to achieve sufficient ion permeability.

The polyolefin porous film has a porosity of preferably 20% by volume to 80% by volume and more preferably 30% by volume to 75% by volume, so as to (i) retain a larger amount of an electrolyte and (ii) obtain the function of reliably preventing (shutting down) a flow of an excessively large electric current at a lower temperature. The polyolefin porous film preferably has a porosity of not less than 20% by volume. This is because such a porosity makes it possible to restrict resistance of the polyolefin porous film to ion permeation. Meanwhile, in view of a mechanical strength of the polyolefin porous film, the porosity of the polyolefin porous film is preferably not more than 80% by volume.

The polyolefin porous film has a pore diameter of preferably not more than 0.3 μm and more preferably not more than 0.14 μm, so that the nonaqueous electrolyte secondary battery laminated separator including the polyolefin porous film can (i) have sufficient ion permeability and (ii) prevent particles from entering the positive electrode and the negative electrode.

As necessary, the nonaqueous electrolyte secondary battery laminated separator can further include another porous layer in addition to the polyolefin porous film and the porous layer in accordance with Embodiment 1 of the present invention. Examples of such another porous layer encompass publicly known porous layers such as a heat-resistant layer, an adhesive layer, and a protective layer. Specific examples of such another porous layer encompass a porous layer identical in composition to the porous layer in accordance with Embodiment 1 of the present invention.

<Method of Producing Polyolefin Porous Film>

A method of producing the polyolefin porous film is not particularly limited, and can be, for example, a method in which (i) a pore forming agent is added to a resin such as a polyolefin so as to form a film and then (ii) the pore forming agent is removed with use of an appropriate solvent.

Specifically, in a case where, for example, the polyolefin porous film is made of a polyolefin resin containing ultra-high molecular weight polyethylene and low molecular weight polyolefin which has a weight-average molecular weight of not more than 10,000, it is preferable in view of production costs that the polyolefin porous film is produced by a method including:

(1) kneading 100 parts by weight of ultra-high molecular weight polyethylene, 5 parts by weight to 200 parts by weight of low molecular weight polyolefin having a weight-average molecular weight of not more than 10,000, and 100 parts by weight to 400 parts by weight of a pore forming agent, so as to obtain a polyolefin resin composition; and (2) forming the polyolefin resin composition into a rolled sheet by rolling, then, the following steps (3) through (5):

(3) removing the pore forming agent from the rolled sheet obtained in the step (2);

(4) stretching the sheet from which the pore forming agent has been removed in the step (3); and (5) heat fixing the sheet having been stretched in the step (4) at a heat-fixation temperature of 100° C. to 150° C., so as to obtain a polyolefin porous film, or the following steps (3') through (5'):

(3') stretching the rolled sheet obtained in the step (2);

(4') removing the pore forming agent from the sheet having been stretched in the step (3'); and (5') heat fixing the sheet having been obtained in the step (4') at a heat-fixation temperature of 100° C. to 150° C., so as to obtain a polyolefin porous film.

Examples of the pore forming agent encompass an inorganic bulking agent and a plasticizer.

Examples of the inorganic bulking agent encompass, but are not particularly limited to, an inorganic filler. Examples of the plasticizer encompass, but are not particularly limited to, a low molecular weight hydrocarbon such as liquid paraffin.

<Method of Producing Nonaqueous Electrolyte Secondary Battery Laminated Separator>

A method of producing the nonaqueous electrolyte secondary battery laminated separator in accordance with an embodiment of the present invention can be, for example, the above-described method of producing the nonaqueous electrolyte secondary battery porous layer in which polyolefin porous film is used as a base material which is coated with the coating solution.

[Embodiment 3: Nonaqueous Electrolyte Secondary Battery Member, and Embodiment 4: Nonaqueous Electrolyte Secondary Battery]

A member for a nonaqueous electrolyte secondary battery (hereinafter referred to as "nonaqueous electrolyte secondary battery member") in accordance with Embodiment 3 of the present invention is obtained by arranging a positive electrode, a porous layer in accordance with Embodiment 1 of the present invention or a nonaqueous electrolyte secondary battery laminated separator in accordance with Embodiment 2 of the present invention, and a negative electrode, the positive electrode, the porous layer or the nonaqueous electrolyte secondary battery laminated separator, and the negative electrode being arranged in this order.

A nonaqueous electrolyte secondary battery in accordance with Embodiment 4 of the present invention includes (i) a porous layer in accordance with Embodiment 1 of the present invention or (ii) a nonaqueous electrolyte secondary battery laminated separator in accordance with Embodiment 2 of the present invention.

The nonaqueous electrolyte secondary battery in accordance with an embodiment of the present invention is, for example, a nonaqueous secondary battery that achieves an electromotive force through doping with and dedoping of lithium, and is a lithium-ion secondary battery including a nonaqueous electrolyte secondary battery member that includes a positive electrode, a porous layer in accordance with an embodiment of the present invention, a polyolefin porous film, and a negative electrode, which are disposed in this order. Alternatively, the nonaqueous electrolyte secondary battery in accordance with an embodiment of the present invention is a lithium ion secondary battery including a nonaqueous electrolyte secondary battery member that includes a positive electrode, a nonaqueous electrolyte secondary battery laminated separator in accordance with an embodiment of the present invention, and a negative electrode, which are disposed in this order. Note that constituent elements of the nonaqueous electrolyte secondary battery other than the porous layer are not limited to those described below.

The nonaqueous electrolyte secondary battery in accordance with an embodiment of the present invention is typically configured so that a battery element is enclosed in an exterior member, the battery element including (i) a structure in which the negative electrode and the positive electrode face each other through the porous layer in accordance with an embodiment of the present invention or the nonaqueous electrolyte secondary battery laminated separator in accordance with an embodiment of the present invention and (ii) an electrolyte with which the structure is impregnated. The nonaqueous electrolyte secondary battery in accordance with an embodiment of the present invention is preferably a secondary battery including a nonaqueous electrolyte, and is particularly preferably a lithium-ion secondary battery. Note that the doping means occlusion, support, adsorption, or insertion, and means a phenomenon in which lithium ions enter an active material of an electrode (such as a positive electrode).

<Positive Electrode>

A positive electrode included in the nonaqueous electrolyte secondary battery member in accordance with an embodiment of the present invention or in the nonaqueous electrolyte secondary battery in accordance with an embodiment of the present invention is not limited to any particular one, provided that the positive electrode is one that is generally used as a positive electrode of a nonaqueous electrolyte secondary battery. Examples of the positive electrode encompass a positive electrode sheet having a structure in which an active material layer including a positive electrode active material and a binder resin is formed on a current collector. The active material layer can further include an electrically conductive agent.

The positive electrode active material is, for example, a material capable of being doped with and dedoped of lithium ions. Specific examples of such a material encompass a lithium complex oxide containing at least one transition metal such as V, Mn, Fe, Co, or Ni. Among such lithium complex oxides, the following lithium complex oxides have a high average discharge potential and are therefore preferable: (i) a lithium complex oxide having an α-NaFeO$_2$ structure, such as lithium nickelate or lithium cobaltate and (ii) a lithium complex oxide having a spinel structure, such as lithium manganese spinel. The lithium complex oxide can further contain any of various metal elements, and is more preferably a complex lithium nickelate.

Furthermore, the lithium nickel complex oxide still more preferably contains at least one metallic element selected from the group consisting of Ti, Zr, Ce, Y, V, Cr, Mn, Fe, Co, Cu, Ag, Mg, Al, Ga, In, and Sn at a proportion of 0.1 mol % to 20 mol % with respect to the sum of the number of moles of the at least one metal element and the number of moles of Ni in the lithium nickelate. This is because such a complex lithium nickelate leads to an excellent cycle characteristic when used in a high-capacity battery. Among others, an active material that contains Al or Mn and that further contains Ni at a proportion of not less than 85%, and more preferably not less than 90%, is particularly preferable. This is because a nonaqueous electrolyte secondary battery including a positive electrode containing such an active material has an excellent cycle characteristic in high-capacity use.

Examples of the electrically conductive agent encompass carbonaceous materials such as natural graphite, artificial graphite, cokes, carbon black, pyrolytic carbons, carbon fiber, and a fired product of an organic polymer compound. It is possible to use (i) only one kind of the above electrically conductive agents or (ii) two or more kinds of the above electrically conductive agents in combination, for example, a mixture of artificial graphite and carbon black.

Examples of the binding agent encompass: thermoplastic resins such as polyvinylidene fluoride, a copolymer of vinylidene fluoride, polytetrafluoroethylene, a vinylidene fluoride-hexafluoropropylene copolymer, a tetrafluoroethylene-hexafluoropropylene copolymer, a tetrafluoroethylene-perfluoroalkyl vinyl ether copolymer, an ethylene-tetrafluoroethylene copolymer, a vinylidene fluoride-tetrafluoroethylene copolymer, a vinylidene fluoride-trifluoroethylene copolymer, a vinylidene fluoride-trichloroethylene copolymer, a vinylidene fluoride-vinyl fluoride copolymer, a vinylidene fluoride-hexafluoropropylene-tetrafluoroethylene copolymer, a thermoplastic polyimide, polyethylene, and polypropylene; acrylic resin; and styrene butadiene rubber. Note that the binding agent also serves as a thickener.

Examples of a method of preparing a positive electrode mix encompasses: a method in which pressure is applied to the positive electrode active material, the electrically conductive agent, and the binding agent (binder resin) on a positive electrode current collector; and a method in which an appropriate organic solvent is used so that the positive electrode active material, the electrically conductive agent, and the binding agent will be in a paste form.

Examples of the positive electrode current collector encompass electric conductors such as Al, Ni, and stainless steel. Among these, Al is preferable because Al is easily processed into a thin film and is inexpensive.

The positive electrode sheet may be produced, that is, the positive electrode mix may be supported by the positive electrode current collector, by for example, a method in which pressure is applied to the positive electrode active material, the electrically conductive agent, and the binding agent on the positive electrode current collector to form a positive electrode mix thereon or a method in which (i) an appropriate organic solvent is used so that the positive electrode active material, the electrically conductive agent, and the binding agent will be in a paste form to provide a positive electrode mix, (ii) the positive electrode mix is applied to the positive electrode current collector, (iii) the applied positive electrode mix is dried so that a sheet-shaped positive electrode mix is prepared, and (iv) then pressure is applied to the sheet-shaped positive electrode mix so that the sheet-shaped positive electrode mix is firmly fixed to the positive electrode current collector.

<Negative Electrode>

A negative electrode included in the nonaqueous electrolyte secondary battery member in accordance with an embodiment of the present invention or in the nonaqueous electrolyte secondary battery in accordance with an embodiment of the present invention is not limited to any particular one, provided that the negative electrode is one that is generally used as a negative electrode of a nonaqueous electrolyte secondary battery. Examples of the negative electrode encompass a negative electrode sheet having a structure in which an active material layer including a negative electrode active material and a binder resin is formed on a current collector. The active material layer can further include an electrically conductive agent.

Examples of the negative electrode active material encompass (i) a material capable of being doped with and dedoped of lithium ions, (ii) a lithium metal, and (iii) a lithium alloy. Specific examples of the material encompass: carbonaceous materials such as natural graphite, artificial graphite, cokes, carbon black, pyrolytic carbons, carbon fiber, and a fired product of an organic polymer compound; chalcogen compounds such as an oxide and a sulfide that are doped with and dedoped of lithium ions at an electric potential lower than that for the positive electrode; metals such as aluminum (Al), lead (Pb), tin (Sn), bismuth (Bi), or silicon (Si), each of which is alloyed with alkali metal; cubic intermetallic compounds ($AlSb$, $Mg_2Si$, and $NiSi_2$) having lattice spaces in which alkali metals can be provided; and lithium nitrogen compounds ($Li_{3-x}M_xN$ (where M represents a transition metal)). Among the above negative electrode active materials, a carbonaceous material that contains, as a main component, a graphite material such as natural graphite or artificial graphite is preferable. This is because such a carbonaceous material is high in potential evenness, and a great energy density can be obtained in a case where the carbonaceous material, which is low in average discharge potential, is combined with the positive electrode. The negative electrode active material can alternatively be a mixture of graphite and silicon, preferably containing Si at a proportion of not less than 5%, and more preferably not less than 10%, with respect to carbon (C) constituting the graphite.

The negative electrode mix can be prepared by, for example, a method in which pressure is applied to the negative electrode active material on a negative electrode current collector or a method in which an appropriate organic solvent is used so that the negative electrode active material will be in a paste form.

Examples of the negative electrode current collector encompass electric conductors such as Cu, Ni, and stainless steel. Among these, Cu is preferable because it is not easily alloyed with lithium in the case of a lithium-ion secondary battery in particular and is easily processed into a thin film.

The negative electrode sheet may be produced, that is, the negative electrode mix may be supported by the negative electrode current collector by, for example, a method in which pressure is applied to the negative electrode active material on the negative electrode current collector to form a negative electrode mix thereon or a method in which (i) an appropriate organic solvent is used so that the negative electrode active material will be in a paste form to provide a negative electrode mix, (ii) the negative electrode mix is applied to the negative electrode current collector, (iii) the applied negative electrode mix is dried so that a sheet-shaped negative electrode mix is prepared, and (iv) then pressure is applied to the sheet-shaped negative electrode mix so that the sheet-shaped negative electrode mix is firmly fixed to the negative electrode current collector. The above paste preferably includes the above electrically conductive agent and the binding agent.

<Nonaqueous Electrolyte>

A nonaqueous electrolyte for use in the nonaqueous electrolyte secondary battery in accordance with an embodiment of the present invention is a nonaqueous electrolyte generally used in a nonaqueous electrolyte secondary battery, and is not limited to any particular one. Examples of the nonaqueous electrolyte encompass a nonaqueous electrolyte prepared by dissolving a lithium salt in an organic solvent. Examples of the lithium salt encompass $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, lower aliphatic carboxylic acid lithium salt, and $LiAlCl_4$. It is possible to use only one kind of the above lithium salts or two or more kinds of the above lithium salts in combination. It is preferable to use, among the above lithium salts, at least one fluorine-containing lithium salt selected from the group consisting of $LiPF_6$, $LiAsF_6$, $LiSbF_6$, $LiBF_4$, $LiCF_3SO_3$, $LiN(CF_3SO_2)_2$, and $LiC(CF_3SO_2)_3$.

Specific examples of the organic solvent in the nonaqueous electrolyte encompass: carbonates such as ethylene carbonate, propylene carbonate, dimethyl carbonate, diethyl carbonate, ethyl methyl carbonate, 4-trifluoromethyl-1,3-dioxolane-2-on, and 1,2-di(methoxy carbonyloxy)ethane; ethers such as 1,2-dimethoxyethane, 1,3-dimethoxypropane, pentafluoropropyl methylether, 2,2,3,3-tetrafluoropropyl difluoro methylether, tetrahydrofuran, and 2-methyl tetrahydrofuran; esters such as methyl formate, methyl acetate, and γ-butyrolactone; nitriles such as acetonitrile and butyronitrile; amides such as N,N-dimethylformamide and N,N-dimethylacetamide; carbamates such as 3-methyl-2-oxazolidone; sulfur-containing compounds such as sulfolane, dimethyl sulfoxide, and 1,3-propane sultone; and fluorine-containing organic solvents each prepared by introducing a fluorine group into any of the organic solvents described above. It is possible to use only one kind of the above organic solvents or two or more kinds of the above organic solvents in combination. Among the above organic solvents, carbonates are preferable. A mixed solvent of a cyclic carbonate and an acyclic carbonate or a mixed solvent of a cyclic carbonate and an ether is more preferable. The mixed solvent of a cyclic carbonate and an acyclic carbonate is still more preferably a mixed solvent of ethylene carbonate, dimethyl carbonate, and ethyl methyl carbonate. This is because such a mixed solvent leads to a wider operating temperature range, and is not easily decomposed even in a case where a negative electrode active material is a graphite material such as natural graphite or artificial graphite.

<Nonaqueous Electrolyte Secondary Battery Member Production Method and Nonaqueous Electrolyte Secondary Battery Production Method>

A nonaqueous electrolyte secondary battery member in accordance with an embodiment of the present invention can be produced by, for example, arranging a positive electrode, a porous layer in accordance with an embodiment of the present invention or a nonaqueous electrolyte secondary battery laminated separator in accordance with an embodiment of the present invention, and a negative electrode in this order.

A nonaqueous electrolyte secondary battery in accordance with an embodiment of the present invention can be produced by, for example, (i) producing a nonaqueous electrolyte secondary battery member as described above, (ii) inserting the nonaqueous electrolyte secondary battery member into a container that will serve as a housing of a nonaqueous electrolyte secondary battery, (iii) filling the container with a nonaqueous electrolyte, and (iv) hermetically sealing the container while reducing pressure inside the container.

The nonaqueous electrolyte secondary battery is not particularly limited in shape and can have any shape such as the shape of a thin plate (sheet), a disk, a cylinder, or a prism such as a cuboid. The nonaqueous electrolyte secondary battery member and the nonaqueous electrolyte secondary battery can each be produced by any method, and can each be produced by a conventionally publicly known method.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

EXAMPLES

The following description will discuss embodiments of the present invention in more detail by Examples and Comparative Examples. Note, however, that the present invention is not limited to these Examples and Comparative Examples.

In each of Examples and Comparative Examples, physical properties and the like of a laminated porous film, a poly- olefin porous film (A layer), and a porous layer (B layer) were measured by the following methods.

(1) Thickness (Unit: μm)

A thickness of the laminated porous film, a thickness of the A layer, and a thickness of the B layer were each measured with use of a high-resolution digimatic measuring unit manufactured by Mitutoyo Corporation.

(2) Weight Per Unit Area (Unit: $g/m^2$)

A sample in the form of a 6.4 cm×4 cm rectangle was cut out from the laminated porous film, and the weight W (g) of the sample was measured. Then, the weight per unit area of the laminated porous film (i.e., weight per unit area of the entirety) was calculated in accordance with the following Formula:

Weight per unit area $(g/m^2)$=W/(0.064×0.04)

The weight per unit area of the A layer was likewise calculated. The weight per unit area of the B layer was calculated by subtracting the weight per unit area of the A layer from the weight per unit area of the entirety.

(3) Volume-Based Particle Size Distribution D50 (Unit: μm)

A dispersion liquid was prepared by (i) mixing, in a screw tube, a small amount of organic filler and 0.2% aqueous sodium hexametaphosphate solution and (ii) irradiating the resulting mixture with ultrasonic waves for 2 minutes.

The aqueous sodium hexametaphosphate solution was placed in a measuring quartz cell of a laser diffraction particle size analyzer (SALD-2200) manufactured by Shimadzu Corporation. While the aqueous sodium hexametaphosphate solution was being stirred, base measurement was carried out. Then, the dispersion liquid was added with use of a pipette, and then a volume-based particle size distribution D50 of an organic filler was measured.

(4) Analysis of Metal Content (Unit: Mg/Kg)

By ICP emission spectrometry, amounts of Na element, Al element, and K element contained in the organic filler were quantified.

Example 1

A porous layer (B layer) was provided on one surface of the following polyolefin porous film (A layer) so as to form a laminated porous film.

<Polyolefin Porous Film (A Layer)>

A polyolefin porous film was prepared by use of polyethylene that is a polyolefin.

Specifically, 70 parts by weight of an ultra-high molecular weight polyethylene powder (340M, manufactured by Mitsui Chemicals, Inc.) and 30 parts by weight of a polyethylene wax (FNP-0115, manufactured by Nippon Seiro Co., Ltd.) having a weight-average molecular weight of 1,000 were mixed with each other so that a mixed polyethylene was prepared. Then, with respect to 100 parts by weight of the mixed polyethylene thus obtained, 0.4 parts by weight of an antioxidant (Irg1010, manufactured by Ciba Specialty Chemicals Inc.), 0.1 parts by weight of an antioxidant (P168, manufactured by Ciba Specialty Chemicals Inc.), and 1.3 parts by weight of sodium stearate were added. Then, calcium carbonate (manufactured by Maruo Calcium Co., Ltd.) having an average particle diameter of 0.1 μm was further added so that the calcium carbonate accounted for 38% by volume of the total volume. Then, the above composition in powder form was mixed with use of a Henschel mixer, and was then melt-kneaded by a twin screw kneading extruder. This produced a polyethylene resin composition. Next, the polyethylene resin composition was rolled with use of a pair of rollers each having a surface temperature of 150° C., so that a sheet was prepared. This sheet was immersed in an aqueous hydrochloric acid solution (in which 4 mol/L of hydrochloric acid and 0.5% by weight of nonionic surfactant were mixed), so that the calcium carbonate was dissolved into the solution and removed from the sheet. Then, the sheet was stretched at 105° C. at a stretch ratio of 6 times, so that a porous film (A layer) made of polyethylene was prepared.

<Porous Layer (B Layer)>

(Production of Coating Solution)

At room temperature, to a 2-L separable flask in which nitrogen substitution had been performed, 154.15 g of resorcin and 113.63 g of 37% aqueous formaldehyde solution were added so that a molar ratio between the resorcin and formaldehyde would be 1:1. Then, 1541.5 g of water and 0.0786 g of sodium carbonate were further added. While the resulting mixture was being stirred, a temperature of the mixture was raised to 80° C., and the stirring was continued. The mixture was maintained at 80° C. for 24 hours, so that a polymerization reaction was made. This produced a suspension containing fine particles of a resorcin-formalin resin (RF resin). After the suspension was cooled, the suspension thus obtained was centrifuged, so that the fine particles of the RF resin precipitated. Then, a supernatant dispersion medium was removed while the precipitating fine particles of the RF resin were left. Then, the RF resin was cleaned by carrying out, twice, a cleaning operation including: adding water which serves as a cleaning liquid; stirring the resulting mixture; and centrifuging the mixture so as to remove the cleaning liquid. The fine particles of the RF resin thus cleaned was dried, so that an organic filler (1) was quantitatively synthesized.

As a binder resin, sodium carboxymethyl cellulose (CMC) (manufactured by Daicel Corporation; CMC1110) was used.

The organic filler (1), the CMC, and a solvent (mixed solvent in which water and isopropyl alcohol were mixed) were mixed at the following ratio. Specifically, with 100 parts by weight of the organic filler (1), 3 parts by weight of the CMC was mixed, and a solvent was mixed so that (i) a mixed solution to be obtained would have a solid content concentration (concentrations of the organic filler (1) and the CMC) of 20.0% by weight and (ii) a composition of the solvent would include 95% by weight of the water and 5% by weight of the isopropyl alcohol. This produced a dispersion liquid of an organic filler. Then, the dispersion liquid thus obtained was dispersed by high pressure (high-pressure dispersion conditions: 100 MPa×3 passes) with use of a high-pressure dispersing device (manufactured by Sugino Machine Limited; Star Burst), so that a coating solution 1 was prepared.

(Preparation of Porous Layer (B Layer)/Preparation of Laminated Porous Film)

One surface of the A layer was subjected to a corona treatment at 20 W/(m²/min). Then, the surface of the A layer, which surface was subjected to the corona treatment, was coated with the coating solution 1 with use of a gravure coater, so that a coating film was formed. Then, the coating film was dried, so that a B layer was formed. This produced a laminated porous film 1 in which the B layer was disposed on the one surface of the A layer. The weight per unit area and thickness of the B layer were as shown in Table 1.

Example 2

A laminated porous film 2 was prepared by use of an A layer and a B layer described below.
<A Layer>
A porous film (A layer) made of polyethylene was prepared as in Example 1.
<B Layer>
A coating solution 1 was prepared as in Example 1.
<Laminated Porous Film>
A laminated porous film 2, in which the B layer was disposed on one surface of the A layer, was obtained as in Example 1 except that the weight per unit area and the thickness were changed as shown in Table 1.

Example 3

A laminated porous film 3 was prepared by use of an A layer and a B layer described below.
<A Layer>
A porous film (A layer) made of polyethylene was prepared as in Example 1.
<B Layer>
An organic filler (2) was quantitatively synthesized as in Example 1 except that 154.15 g of resorcin and 227.25 g of 37% aqueous formaldehyde solution were mixed so that a molar ratio between the resorcin and formaldehyde would be 1:2. A coating solution 2 was prepared as in Example 1 except that the organic filler (2) was used instead of the organic filler (1).
<Laminated Porous Film>
A laminated porous film 3, in which the B layer was disposed on one surface of the A layer, was obtained as in Example 1 except that (i) the coating solution 2 was used instead of the coating solution 1 and (ii) the weight per unit area and the thickness were changed as shown in Table 1.

Example 4

A laminated porous film 4 was prepared by use of an A layer and a B layer described below.
<A Layer>
A porous film (A layer) made of polyethylene was prepared as in Example 1.
<B Layer>
A coating solution 2 was prepared as in Example 3.
<Laminated Porous Film>
A laminated porous film 4, in which the B layer was disposed on one surface of the A layer, was obtained as in Example 1 except that (i) the coating solution 2 was used instead of the coating solution 1 and (ii) the weight per unit area and the thickness were changed as shown in Table 1.

Example 5

A laminated porous film 5 was prepared by use of an A layer and a B layer described below.
<A Layer>
A porous film (A layer) made of polyethylene was prepared as in Example 1.
<B Layer>
(Production of Coating Solution)
At room temperature, to a 2-L separable flask in which nitrogen substitution had been performed, 154.15 g of resorcin and 227.25 g of 37% aqueous formaldehyde solution were added so that a molar ratio between the resorcin and formaldehyde would be 1:2. Then, 1541.5 g of water and 0.0786 g of sodium carbonate were further added. While the resulting mixture was being stirred, a temperature of the mixture was raised to 80° C., and the stirring was continued. The mixture was maintained at 80° C. for 24 hours, so that a polymerization reaction was made. This produced a suspension containing fine particles of a resorcin-formalin resin (RF resin). After the suspension was cooled, the suspension thus obtained was centrifuged, so that the fine particles of the RF resin precipitated. Then, a supernatant liquid was <Laminated Porous Film>

A laminated porous film 7, in which the B layer was disposed on one surface of the A layer, was obtained as in Example 1 except that the coating solution 5 was used instead of the coating solution 1.

[Evaluation of Physical Properties]

Physical properties and the like of the laminated porous films 1 through 7 thus obtained were measured by the method described above. The results of the measurement are shown in Table 1.

TABLE 1

|  | Laminated porous film | Thickness of laminated porous film (μm) | Thickness of B layer (μm) | Weight per unit area of B layer (g/m$^2$) | Metal content (mg/kg) | | | |
| --- | --- | --- | --- | --- | --- | --- | --- | --- |
|  |  |  |  |  | Na | Al | K | Total |
| Example 1 | 1 | 27.2 | 15.2 | 4.0 | 10 | 10 | 5 | 25 |
| Example 2 | 2 | 34.7 | 22.7 | 6.7 | 10 | 10 | 5 | 25 |
| Example 3 | 3 | 25.4 | 13.4 | 3.7 | 7 | 5 | 5 | 17 |
| Example 4 | 4 | 29.6 | 17.6 | 6.2 | 7 | 5 | 5 | 17 |
| Example 5 | 5 | 29.6 | 17.6 | 6.2 | 200 | 0.5 | 0.5 | 201 |
| Comparative Example 1 | 6 | 36.3 | 24.3 | 7.7 | 300 | 2000 | 5 | 2305 |
| Comparative Example 2 | 7 | 22.8 | 10.8 | 4.8 | 5 | 1 | 0.5 | 6.5 | removed. Then, without cleaning, the fine particles of the RF resin were dried. An organic filler (3) was thus quantitatively synthesized.

A coating solution 3 was prepared as in Example 1 except that the organic filler (1) was replaced with the organic filler (3).

<Laminated Porous Film>

A laminated porous film 5, in which the B layer was disposed on one surface of the A layer, was obtained as in Example 1 except that (i) the coating solution 3 was used instead of the coating solution 1 and (ii) the weight per unit area and the thickness were changed as shown in Table 1.

Comparative Example 1

A laminated porous film 6 was prepared by use of an A layer and a B layer described below.

<A Layer>

A porous film (A layer) made of polyethylene was prepared as in Example 1.

<B Layer>

A coating solution 4 was prepared as in Example 1 except that a melamine resin (EPOSTAR S6; manufactured by Nippon Shokubai Co., Ltd.) was used as an organic filler.

<Laminated Porous Film>

A laminated porous film 6, in which the B layer was disposed on one surface of the A layer, was obtained as in Example 1 except that the coating solution 4 was used instead of the coating solution 1.

Comparative Example 2

A laminated porous film 7 was prepared by use of an A layer and a B layer described below.

<A Layer>

A porous film (A layer) made of polyethylene was prepared as in Example 1.

<B Layer>

A coating solution 5 was prepared as in Example 1 except that a phenol resin (Marilin; manufactured by Gunei Chemical Industry Co., Ltd.) was used as an organic filler.

[Preparation of Nonaqueous Electrolyte Secondary Battery]

By a method described below, nonaqueous electrolyte secondary batteries 1 through 7 were prepared with use of the laminated porous films 1 through 7, respectively, each of which served as a nonaqueous electrolyte secondary battery laminated separator.

<Positive Electrode>

A commercially available positive electrode was used. The positive electrode was produced by coating an aluminum foil with $LiNi_{0.5}Mn_{0.3}Co_{0.2}O_2$/electrically conductive agent/PVDF (weight ratio 92:5:3). The aluminum foil was partially cut off so that (i) a positive electrode active material layer was present in an area of 40 mm×35 mm and (ii) the area was surrounded by an area with a width of 13 mm in which area no positive electrode active material layer was present. A piece of the aluminum foil which was cut off was used as a positive electrode. The positive electrode active material layer had a thickness of 58 μm and a density of 2.50 g/cm$^3$.

<Negative Electrode>

A commercially available negative electrode was used. The negative electrode was produced by coating a copper foil with graphite/styrene-1,3-butadiene copolymer/sodium carboxymethyl cellulose (weight ratio 98:1:1). The copper foil was partially cut off so that (i) a negative electrode active material layer was present in an area of 50 mm×40 mm and (ii) the area was surrounded by an area with a width of 13 mm in which area no negative electrode active material layer was present. A piece of the copper foil which was cut off was used as a negative electrode. The negative electrode active material layer had a thickness of 49 μm and a density of 1.40 g/cm$^3$.

<Preparation of Nonaqueous Electrolyte Secondary Battery>

In a laminate pouch, the positive electrode, the laminated porous film 1, and the negative electrode were disposed (arranged) in this order so that (i) the B layer of the laminated porous film 1 and the positive electrode active material layer of the positive electrode are in contact with each other and (ii) the A layer of the laminated porous film 1 and the negative electrode active material layer of the negative electrode are in contact with each other. This produced a nonaqueous electrolyte secondary battery member. In so doing, the positive electrode and the negative electrode were arranged so that the positive electrode active material layer of the positive electrode had a main surface that was entirely covered by the main surface of the negative electrode active material layer of the negative electrode.

Subsequently, the nonaqueous electrolyte secondary battery member was put into a bag made of an aluminum layer and a heat seal layer which were disposed on each other. Then, 0.23 mL of nonaqueous electrolyte was put into the bag. The nonaqueous electrolyte had been prepared by dissolving $LiPF_6$ in a mixed solvent in which ethylene carbonate, ethyl methyl carbonate, and diethyl carbonate were mixed at a ratio of 3:5:2 (volume ratio), so that a concentration of the $LiPF_6$ would become 1 mol/L. The bag was then heat-sealed while the pressure inside the bag was reduced. This produced a nonaqueous electrolyte secondary battery 1.

The nonaqueous electrolyte secondary batteries 2 through 7 were prepared as with the nonaqueous electrolyte secondary battery 1 except that the laminated porous films 2 through 7 were used, respectively.

[Test of Storage at Constant-Voltage Charge at High Temperature]

Each of new nonaqueous electrolyte secondary batteries 1 through 7, which had not been subjected to any charge-discharge cycle, was subjected to four cycles of initial charge and discharge, each of the four cycles being carried out at 25° C., at a voltage ranging from 4.1 V to 2.7 V, and at an electric current value of 0.2 C (note that 1 C is an electric current value at which a battery rated capacity derived from a one-hour rate discharge capacity was discharged in one hour, and this applies to the following descriptions).

Subsequently, the nonaqueous electrolyte secondary battery was charged at 55° C., at 2.7 V to 4.2 V, and at a constant current of 1.0 C. Then, the nonaqueous electrolyte secondary battery was kept charged at 55° C. and at a constant voltage for 168 hours. Then, the nonaqueous electrolyte secondary battery was discharged at 55° C. and at a constant current of 1.0 C.

The results are shown in Table 2 with the assumption of the following formula: 1.0 C discharge capacity (mAh) after remaining charged at constant voltage for 168 hours/1.0 C charge capacity (mAh)=battery capacity recovery rate (%)

TABLE 2

| | Nonaqueous electrolyte secondary battery | Battery capacity recovery rate (%) after storage at constant-voltage charge at high temperature (%) |
|---|---|---|
| Example 1 | 1 | 81.8 |
| Example 2 | 2 | 82.2 |
| Example 3 | 3 | 87.0 |
| Example 4 | 4 | 86.4 |
| Example 5 | 5 | 81.8 |
| Comparative Example 1 | 6 | 70.3 |
| Comparative Example 2 | 7 | 77.7 |

[Results]

As shown in Table 2, such a high value as not less than 81.8% was exhibited, as a battery capacity recovery rate after storage at a constant-voltage charge at a high temperature, by a nonaqueous electrolyte secondary battery including a porous layer which includes an organic filler in which a total amount of Na element, Al element, and K element contained falls within a range of 10 (mg/kg) to 2000 (mg/kg).

INDUSTRIAL APPLICABILITY

A porous layer in accordance with an embodiment of the present invention can be used for production of a nonaqueous electrolyte secondary battery which has excellent battery capacity recovery rate after storage at a constant-voltage charge at a high temperature.

The invention claimed is:

1. A nonaqueous electrolyte secondary battery porous layer comprising:
   an organic filler,
   the organic filler containing at least one metallic element selected from the group consisting of Na element, Al element, and K element so that a total amount of the Na element, the Al element, and the K element contained in the organic filler satisfies the following formula:

10 (mg/kg)≤the total amount of the Na element, the Al element, and the K element relative to a total weight of the organic filler≤1000 (mg/kg).

2. The nonaqueous electrolyte secondary battery porous layer as set forth in claim 1, further comprising:
   a binder resin.

3. The nonaqueous electrolyte secondary battery porous layer as set forth in claim 2, wherein
   the binder resin is at least one resin selected from the group consisting of a polyolefin, a (meth)acrylate-based resin, a fluorine-containing resin, a polyamide-based resin, a polyester-based resin, and a water-soluble polymer.

4. The nonaqueous electrolyte secondary battery porous layer as set forth in claim 3, wherein
   the polyamide-based resin is an aramid resin.

5. A nonaqueous electrolyte secondary battery laminated separator comprising:
   a polyolefin porous film; and
   a nonaqueous electrolyte secondary battery porous layer recited in claim 1, the nonaqueous electrolyte secondary battery porous layer being disposed on at least one surface of the polyolefin porous film.

6. A nonaqueous electrolyte secondary battery member comprising:
   a positive electrode;
   a nonaqueous electrolyte secondary battery porous layer recited in claim 1; and
   a negative electrode,
   the positive electrode, the nonaqueous electrolyte secondary battery porous layer, and the negative electrode being arranged in this order.

7. A nonaqueous electrolyte secondary battery comprising:
   a nonaqueous electrolyte secondary battery porous layer recited in claim 1.

8. A nonaqueous electrolyte secondary battery member comprising:
   a positive electrode;
   a nonaqueous electrolyte secondary battery laminated separator recited in claim 5; and
   a negative electrode,
   the positive electrode, the nonaqueous electrolyte secondary battery laminated separator, and the negative electrode being arranged in this order.

9. A nonaqueous electrolyte secondary battery comprising:
 a nonaqueous electrolyte secondary battery laminated separator recited in claim 5.

\* \* \* \* \*